Figure 1:
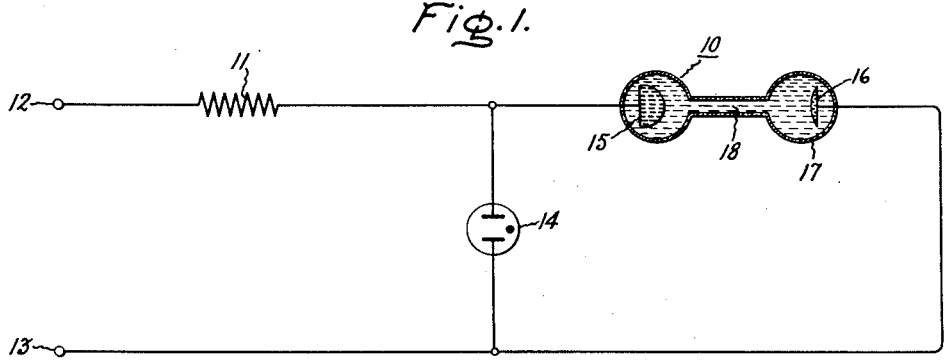

May 7, 1957 — W. A. MATTOX — 2,791,473
ELAPSED TIME INDICATOR
Filed Jan. 31, 1955

Inventor:
William A. Mattox,
by His Attorney.

United States Patent Office 2,791,473
Patented May 7, 1957

2,791,473
ELAPSED TIME INDICATOR

William A. Mattox, Schenectady, N. Y., assignor to General Electric Company, a corporation of New York Application January 31, 1955, Serial No. 485,153

7 Claims. (Cl. 340—213)

This invention relates to timing devices, and more particularly to an electrical device for indicating the expiration of a predetermined period of time during which the device has been energized.

There are many instances in which it is desirable to provide a visual indication at the end of a predetermined elapsed period of time during which electrical equipment has been energized. For example, in the aircraft industry it is common practice to provide indicating devices, known as elapsed time indicators, for warning personnel when equipment has been in operation for a predetermined length of time, so that preventive maintenance may be performed on the equipment. Heretofore, it has been common practice to provide elapsed time indicators of the clock type which are expensive to procure initially and are reasonably delicate during operation.

Accordingly, it is a primary object of the present invention to provide an elapsed time indicator that is of rugged construction and is inexpensive to manufacture.

Another object of the invention is to provide such an indicator that is electrical in character and embodies a minimum number of components.

An elapsed time indicator constructed in accordance with the invention may comprise an electrolytic cell of the type commonly known as a coulometer. The electrolytic cell is adapted to be energized by a direct voltage, and may be interconnected with the equipment whose elapsed period of operating time is to be measured, so that the voltage source is connected to the indicator when the equipment is energized. When the voltage source is connected to the indicator, metal is transferred from the anode to the cathode of the electrolytic cell, and during this period the electrical resistance of the cell is relatively low. At the end of a predetermined time interval, determined by the construction of the electrolytic cell and the current flow therethrough, the transfer of the fixed amount of metal from the anode to the cathode is completed and the resistance of the cell is materially increased. Indicating means are connected in circuit relationship with the electrolytic cell to give an indication when the resistance of the cell is increased at the end of the predetermined period of operating time.

The novel features which are believed to be characteristic of the invention are set forth in the appended claims. The invention, however, both as to its organization and method of operation, together with further objects and advantages thereof may best be understood by reference to the following description taken in conjunction with the accompanying drawing, in which Fig. 1 is a circuit diagram of one embodiment of the invention showing circuit conditions near the beginning of the period of time to be measured; and Fig. 2 is a diagram similar to Fig. 1 but showing circuit conditions at the end of the measured period of time.

Figure 2:
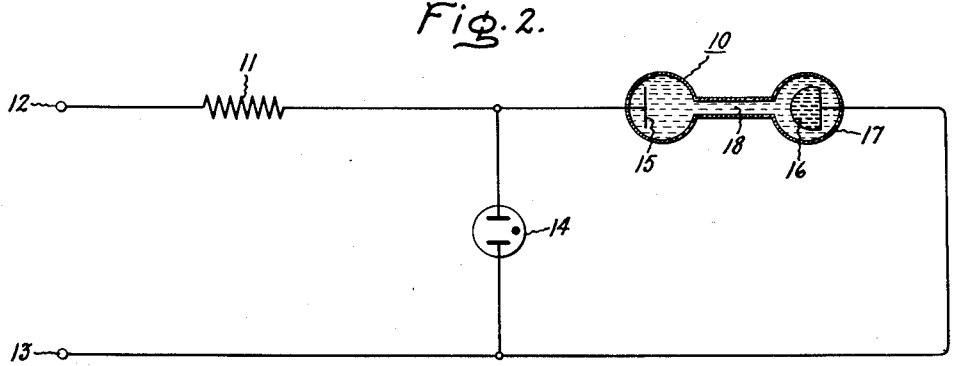

Referring to Fig. 1, the embodiment of the invention there shown comprises an electrolytic cell 10 and an impedance, such as a current limiting resistor 11, connected in series between terminals 12 and 13. A glow discharge device 14 of conventional type is connected in parallel with the electrolytic cell 10. A source of direct voltage (not shown), which may be interconnected with and controlled by the equipment whose elapsed period of operating time is to be measured, may be connected to terminals 12 and 13. The equipment whose operating time is to be measured controls the direct voltage source so that it is energized or connected to terminals 12 and 13 only when the equipment itself is energized. Alternatively, the source may be of alternating current type, and a rectifier included in the indicator so that current flow through the cell is unidirectional.

The electrolytic cell 10 may be a conventional coulometer of the general type well known in the art comprising an anode 15 and a cathode 16 mounted within a glass envelope 17 filled with an electrolyte 18. Generally, such a cell is used to integrate and measure the flow of current through a circuit. In the present application, however, the cell is utilized to measure the integrated length of time that current flows through the circuit.

The operation of an electrolytic cell is well known in the art and hence will be here described only briefly. Basically, the operation consists of applying a D. C. voltage between the anode 15 and cathode 16 to transfer metal from the anode to the cathode through the electrolyte 18. The electrolyte generally comprises an acid having dissolved therein a corresponding acid salt of the metal to be transferred from the anode to the cathode. In the present instance, where it is desired to have a material change of resistance when the electroplating process is completed, a weak acid is used as the electrolyte. The invention is not limited to the use of any particular electrolyte or metals, various ones being satisfactory, as is well known in the art. For example, silver may be used as the metallic element and a weak solution of lactic acid having silver lactate dissolved therein may be used as the electrolyte. As a further example, when silver is the metal to be transferred from the anode to the cathode, a weak solution of acetic acid having silver acetate dissolved therein may be used as the electrolyte. It is pointed out that, in general, any weak organic acid may be used as the electrolyte and any metal whose corresponding acid salt is soluble in water may be used as the metal to be transferred. Organic acids are preferred because of their low electrical resistance when their metallic salt is dissolved therein and their relatively high resistance when the metallic salt is removed therefrom. The choice of electrolyte may depend on environmental factors such, for example, as the range of temperatures within which the device must operate satisfactorily.

In operation, when the direct current source (not shown) is connected to terminals 12 and 13, the metal present on the anode 15 of the electrolytic cell 10 begins to be transferred to the cathode 16. If the device is de-energized before the transfer of metal is complete, the transferred metal remains on the cathode, and, when the device is again energized, the process of transfer is continued. During the time the metal is being transferred, the resistance of the electrolytic cell 10 is relatively low and the value of the current limiting resistor 11 is selected to be large relative to the cell resistance. Thus, a majority of the voltage drop in the series connected circuit occurs across resistor 11 and only a small drop occurs across the electrolytic cell 10. The glow discharge device 14 is selected to have the value of its breakdown voltage greater than the voltage drop across the electrolytic cell during the time that metal is being transferred from the anode to the cathode of the cell. The breakdown voltage of the glow discharge device is also chosen to be less than the voltage drop across the electrolytic cell when the transfer of metal has been completed.

As seen in Fig. 2, after a predetermined time has elapsed, all of the transferable metal is electroplated on the cathode 16 of the cell 10 and the electrolyte is exhausted of its metallic ions. At this time, the resistance of the cell materially increases and the voltage drop across the cell becomes greater than the breakdown voltage of the glow discharge device 14. Thus, the discharge device 14 fires and gives a visual indication of the completion of the metal transferring process, and hence of the total time during which the device has been energized. In order to increase the resistance of cell 10 after the metal transfer is completed, the cell is narrowed between the two electrodes to provide only a small cross-sectional area filled with electrolyte. Of course, the invention is not limited to this particular type of cell construction.

The length of time required to transfer any particular amount of metal from the anode to the cathode of the electrolytic cell depends upon numerous factors that influence the amount of current flowing through the cell, such as the choice of electrolyte, concentration of electrolyte, length of conducting path of the electrolyte, voltage applied to the device, the value of resistor 11, and other factors well known to those skilled in the art. The proper values of the various parameters to provide a desired period of transfer may be easily determined by experimentation. It is also apparent that the accuracy of the indicator depends on the accuracy of the voltage source, after the other design parameters are determined; that is, variations in the voltage source cause corresponding variations in current flow through the electrolytic cell and variations in the rate of transfer of metal from anode to cathode.

It is pointed out that the electrolytic cell 10 may be reactivated by reversing the polarity thereof to transfer metal from what was formely the cathode to the former anode. Because, when the polarity of the cell is reversed, the resistance is high, the cell may have to be reactivated for a short time before the beginning of the period of time to be indicated.

It is now apparent that the present invention attains the objectives set forth above, and provides an elapsed time indicator that is inexpensive to manufacture and is rugged in construction, when compared to the conventional clock-type indicator now in use. There are no mechanical moving parts in the device and only a minimum number of electrical components. Although the cost of the indicator of the invention is so small that the device may be considered as expendable, the reactivating feature further increases its usefulness and attactiveness.

Although a particular embodiment of the invention has been illustrated, it will be understood that the invention is not limited thereto since various modifications may be made. It is contemplated by the appended claims to cover any such modification as falls within the true spirit and scope of the invention.

What I claim as new and desire to secure by Letters Patent of the United States is:

1. An elapsed time indicator comprising an electrolytic cell for connection across a voltage source, said electrolytic cell having an anode and a cathode and adapted to transfer a fixed amount of metal from said anode to said cathode in a predetermined time, and means connected in circuit relationship with said electrolytic cell for giving an indication when transfer of metal from said anode to said cathode is completed.

2. An elapsed time indicator comprising an electrolytic cell for connection across a voltage source, said electrolytic cell having an anode and a cathode and adapted to transfer a fixed amount of metal from said anode to said cathode in a predetermined time, and means connected in circuit relationship with said electrolytic cell for giving an indication when the resistance of said electrolytic cell changes due to completion of transfer of metal from said anode to said cathode.

3. An elapsed time indicator comprising an electrolytic cell and an impedance for connection in series across a voltage source, said electrolytic cell having an anode and a cathode and adapted to transfer a fixed amount of metal from said anode to said cathode in a predetermined time, and means connected in circuit relationship with said electrolytic cell for giving an indication when the voltage drop across said electrolytic cell increases due to completion of transfer of metal from said anode to said cathode.

4. An elapsed time indicator comprising an electrolytic cell and an impedance for connection in series across a voltage source, said electrolytic cell having an anode and a cathode and adapted to transfer a fixed amount of metal from said anode to said cathode, and glow discharge means connected across said electrolytic cell for giving an indication when the voltage drop across said electrolytic cell increases due to completion of transfer of metal from said anode to said cathode.

5. An elapsed time indicator comprising an electrolytic cell and an impedance for connection in series across a voltage source, said electrolytic cell having an anode and a cathode and adapted to transfer a fixed amount of metal from said anode to said cathode, and a glow discharge device connected in parallel with said electrolytic cell, the breakdown voltage of said glow discharge device being greater than the voltage drop across said electrolytic cell during the transfer of metal from said anode to said cathode and less than the voltage drop across said electrolytic cell after completion of said transfer.

6. An elapsed time indicator comprising an electrolytic cell having an anode and a cathode and adapted to transfer a fixed amount of metal from said anode to said cathode in a predetermined time and means connected in circuit relationship with said electrolytic cell to indicate when said predetermined time has elapsed.

7. An elapsed time indicator comprising an electrolytic cell having an anode and a cathode and adapted to transfer a fixed amount of metal from said anode to said cathode in a predetermined time and means connected in circuit relationship with said electrolytic cell and responsive to the transfer of said fixed amount of metal to indicate when said predetermined time has elapsed.

References Cited in the file of this patent
UNITED STATES PATENTS

| | | |
|---|---|---|
| 1,562,932 | Walker | Nov. 24, 1925 |
| 1,817,200 | Mershon et al. | Aug. 4, 1931 |
| 2,319,196 | Anderson et al. | May 18, 1943 |
| 2,324,188 | Beetem | July 13, 1943 |
| 2,457,234 | Herbert et al. | Dec. 28, 1948 |